Figure 3:
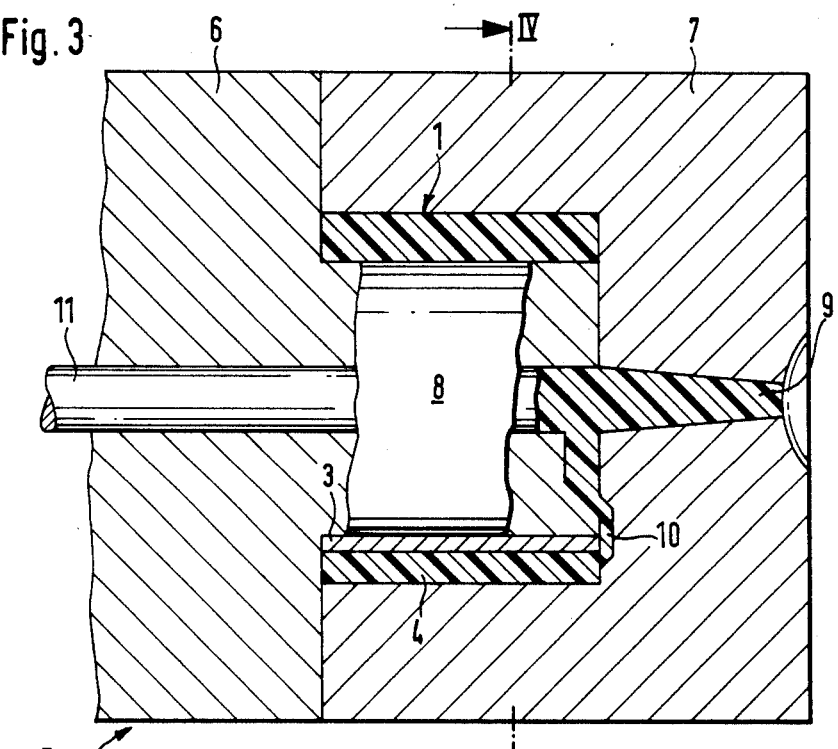

United States Patent [19]

Rabe

[11] Patent Number: 4,800,057
[45] Date of Patent: Jan. 24, 1989

[54] METHOD OF PRODUCING A NOVEL STRUCTURAL ELEMENT

[75] Inventor: Jürgen Rabe, Aurachtal, Fed. Rep. of Germany

[73] Assignee: INA Walzlager Schaeffler KG, Fed. Rep. of Germany

[21] Appl. No.: 105,548

[22] Filed: Oct. 5, 1987

[30] Foreign Application Priority Data

Oct. 16, 1986 [DE] Fed. Rep. of Germany ....... 3635247

[51] Int. Cl.$^4$ ............................................. B29C 45/14
[52] U.S. Cl. ..................................... 264/229; 264/275; 264/279; 249/83; 384/295; 384/906; 425/117
[58] Field of Search ...................... 29/447, 527.3, 527.4; 249/83, 85; 264/273, 274, 275, 278, 271.1, 229, 279; 384/295, 296, 906; 425/110, 116, 117; 428/458, 461, 36, 68, 76

[56] References Cited

U.S. PATENT DOCUMENTS

| 2,554,008 | 5/1951 | Burger | 204/274 X |
| 2,666,677 | 1/1954 | Miller | 384/296 |
| 2,713,525 | 7/1955 | Hinman | 384/296 |
| 3,305,325 | 2/1967 | Le Brasse et al. | 428/458 X |
| 3,913,444 | 10/1975 | Otte | 29/447 X |
| 3,937,780 | 2/1976 | Mercier | 264/274 |
| 4,548,843 | 10/1985 | Kozuka et al. | 428/461 X |
| 4,598,002 | 7/1986 | Kimura | 428/36 |

FOREIGN PATENT DOCUMENTS

| 3624609 | 2/1987 | Fed. Rep. of Germany | 264/275 |
| 61393 | 8/1926 | Sweden | 425/117 |

Primary Examiner—P. W. Echols
Assistant Examiner—Andrew E. Rawlins
Attorney, Agent, or Firm—Bierman and Muserlian

[57] ABSTRACT

A method of producing a structural element comprising a metallic sleeve provided with a continuous axial slot at a circumferential area and an outer surface completely surrounded by a jacket comprising making a metallic sleeve (3,18) with an inner diameter corresponding to a maximum of the inner diameter of the finished structural element (1,16) surrounding the sleeve with the jacket (4,17) in an apparatus (5) provided with a core (8) for receiving the metallic sleeve (3,18) and elastically widening the metallic sleeve (3,18) when placed on the core (8) whereby the slot (2,19) of the metallic sleeve (3,18) is at least partially filled with the material of the jacket (4,17) during formation of the jacket (4,17) so that the boundary surfaces of the slot (2,19) of the metallic sleeve (3,18) is at least partially covered, and the structural element produced thereby.

2 Claims, 2 Drawing Sheets

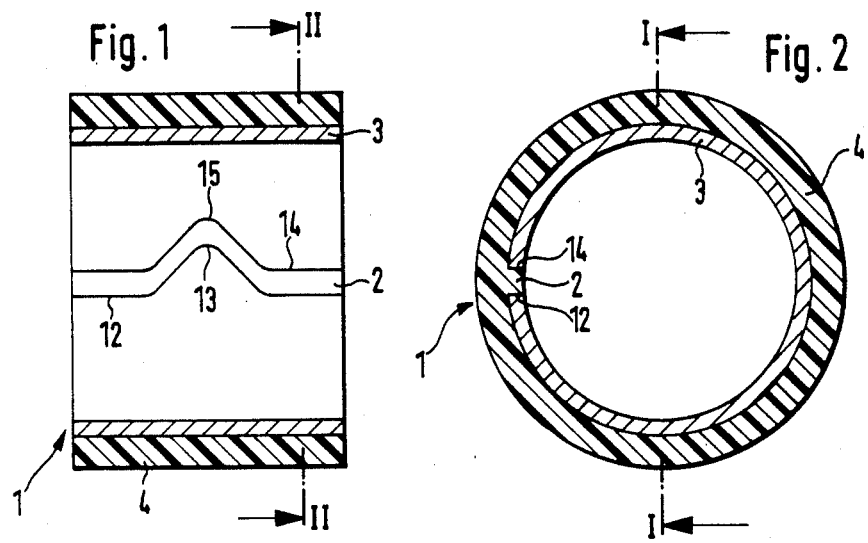
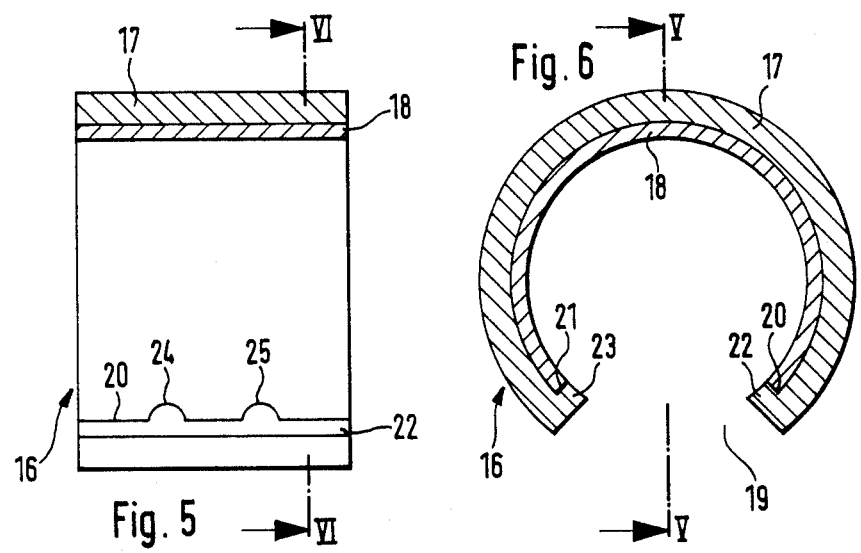

METHOD OF PRODUCING A NOVEL STRUCTURAL ELEMENT

STATE OF THE ART

Structural elements comprising a metallic sleeve, preferably a thin-walled cylindrical metal sleeve, provided with a continuous axial slot at a circumferential area thereof and whose outer surface is completely encased in a jacket are known and are used for a variety of different applications such as sliding bearings or as a reducing bush, and can be made especially economically since the production of the metallic sleeve can be obtained in a non-cutting manner from a sheet metal strip while the jacket can be produced e.g. as injection molded part.

In a known method for making the said structural elements, the metallic sleeve is resilient and radially flexible because the slot is pressed into a separately produced jacket, but it has been shown that in structural elements made by this method, the bore diameter of the metallic sleeve after insertion varies within such broad limits that these structural elements cannot meet increased precision requirements such as in case of sliding bearings. Moreover, the metallic sleeve is not fixed axially as well as in the circumferential direction in the jacket.

Although proposals have been made for increasing the precision of the structural elements by using non-slotted metallic sleeves e.g. through drawing or metal cutting, such measures considerably increase the production costs. To attain the positional stability of the metallic sleeve in the jacket, it has been further proposed in connection with non-slotted metallic sleeves to provide the latter with protuberances at their outer surface through cutting or e.g. through knurling. The production of such protuberances also considerably increases the manufacturing costs, apart from the fact that this measure is applicable only for relatively thick-walled metallic sleeves.

OBJECTS OF THE INVENTION

It is an object of the invention to provide a method of producing a structural element which allows despite the use of a slotted metallic sleeve the production of the structural element with a bore diameter within narrow tolerances and which in addition allows a positional stability of the metallic sleeve in the jacket in a simple manner.

It is another object of the invention to provide novel improved structural elements of this type.

This and other objects and advantages of the invention will become obvious from the following detailed description.

THE INVENTION

The novel method of the invention of producing a structural element comprising a metallic sleeve provided with a continuous axial slot at a circumferential area and an outer surface completely surrounded by a jacket comprises making a metallic sleeve (3,18) with an inner diameter corresponding to a maximum of the inner diameter of the finished structural element (1,16) surrounding the said sleeve with the jacket (4,17) in an apparatus (5) provided with a core (8) for receiving the metallic sleeve (3,18) and elastically widening the metallic sleeve (3,18) when placed on the core (8) whereby the slot (2,19) of the metallic sleeve (3,18) is at least partially filled with the material of the jacket (4,17) during formation of the jacket (4,17) so that the boundary surface of the slot (2,19) of the metallic sleeve (3,18) is at least partially covered.

The method of forming the jacket depends on the material it is made of. For example, the method may be injection molding, die casting, compressing, sintering and dipping.

The method of filling the slot in the metallic sleeve with the material of the jacket will depend upon the respective structural element. When the jacket is designed as a closed ring, the slot may be completely filled by the jacket material and when the jacket is slitted in the area of the metallic sleeve slot, the metallic sleeve slot is partially filled with the jacket material so that the jacket material bears in a projection-like manner against the boundary surfaces of the slot.

Provided the metallic sleeve when being placed on the core is elastically widened to a degree which exceeds the dimension by which the material of the jacket inserted in the slot thereof shrinks after removing the structural element from the core during the cooling off period, the metallic sleeve is kept in an elastically widened state by the jacket material engaging its slot. When further suitably selecting the degree of widening of the metallic sleeve in dependence on the respective structural element with consideration of the shrinkage behavior of the jacket material, a reproducible defined bore diameter within narrow tolerance limits is attained which without the method of the invention would be achievable only when using non-slotted metallic sleeves. In this connection, when using a sleeve whose inner diameter corresponds exactly to the inner diameter of the finished structural element, there is the borderline case where the elastic widening of the sleeve caused by the jacket material engaging in the slot is just about zero. Moreover, the engagement of the jacket material in the slot of the metallic sleeve provides a safeguard against rotation between both parts without requiring special means.

In a structural element made by the method of the invention, a positional stability between the metallic sleeve and the jacket even in the axial direction is achieved by a modification of the invention by providing at least one of the boundary edges of the slot of the metallic sleeve at a distance from its ends with a protuberance which is at least partially surrounded by the jacket material, or with a recess which is partially filled with the jacket material.

In one embodiment of the invention, the shape of the boundary edges correspond to each other so that a protuberance provided at one of the boundary edges is provided opposite to a corresponding recess at the other boundary edge. Thus, two boundary edges can be made in one cutting step during cutting the blank for the metallic sleeve from a metallic strip when using a cutting tool with a contour corresponding to the shape of the boundary edges.

A final embodiment of the invention provides that the boundary edges extend in a straight-line and include recesses at the opposite areas thereof and by this measure, the boundary edges can be produced in a simple manner by initially punching in the region of the cutting area the metallic strip from which the blank for the metallic sleeve is made and then separating it by a simple straight cutting tool.

Figure 4:
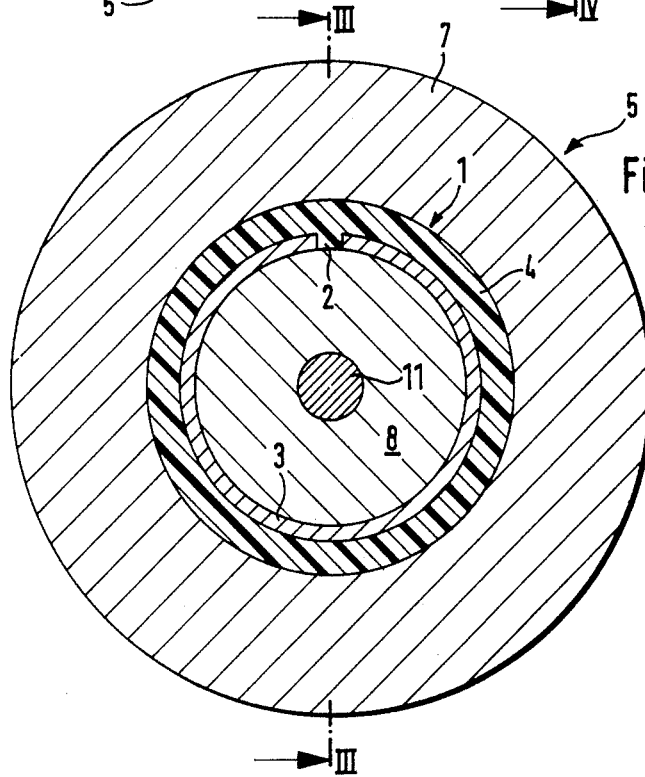

Referring now to the drawings:

FIG. 1 is a longitudinal cross-section of a structural element of the invention taken along the line I—I of FIG. 2 and produced by the method of the invention and FIG. 2 is a cross-section taken along the line II—II of FIG. 1, FIG. 3 is a longitudinal cross-section of an injection mold taken along the line III—III of FIG. 4 for carrying out the method of the invention and FIG. 4 is a cross-section taken along the line IV—IV of FIG. 3, FIG. 5 is a longitudinal cross-section of a structural element of the invention taken along the line V—V of FIG. 6 and produced by the method of the invention and FIG. 6 is a cross-section taken along the line VI—VI of FIG. 5.

FIGS. 1 and 2 show a structural element produced by the method of the invention comprising a thin-walled metallic sleeve 3 which is provided with a continuous axial slot 2 at a circumferential area thereof and whose outer surface is completely surrounded by an annular jacket 4 made of polymeric material. As can be seen from FIGS. 3 and 4, the structural element 1 is produced in an injection mold 5 which includes axially separable mold parts 6 and 7 and contains a mold cavity in correspondence with the structural member 1. The mold part 6 has a core 8 on which the metallic sleeve 3 is placed prior to closing and filling of the mold 5 with polymeric material and then surrounded by the jacket 4 upon introducing polymeric material into the mold 5. For adding the polymeric material, the mold half 7 includes a sprue 9 from which the polymeric material reaches the actual mold cavity via three channels 10 extending in the end surface of the core 8 and spaced from each other at a corresponding angular distance. In FIG. 3, only one channel 10 is illustrated and arranged for longitudinal movement in the mold element 6 is an ejector 11 for separating the finished structural element from the mold 5.

In accordance with the invention, the production of the structural element 1 is effected by initially providing the metallic sleeve 3 with an inner diameter which at a maximum corresponds to the inner diameter of the finished structural element 1. Then, the metallic sleeve 3 is placed on the core 8 whose outer diameter is greater than the inner diameter of the metallic sleeve and thus is elastically widened. After being closed, the injection mold 5 is completely filled with polymeric material to form the jacket 4 whereby, as can be seen from FIGS. 2 to 4, the slot 2 of the metallic sleeve 3 is also completely filled with polymeric material. After opening the injection mold 5, the structural element 1 is ejected therefrom.

The degree of elastic widening of the metallic sleeve 3 is greater than the dimension by which the polymeric material fed into the slot 2 of the metallic sleeve 3 shrinks after ejection of the structural element 1 from the injection mold 5 during the cooling period. The metallic sleeve 3 is thus kept in an elastically widened state by the polymeric material within the slot 2 and has a reproducible and defined inner diameter which is within tolerance limits which are attainable without applying the method of the invention only by use of a non-slotted metallic sleeve. The exact dimension of the inner diameter of the metallic sleeve 3 is determined by suitable selection of the degree of elastic widening with consideration of the shrink behavior of the used polymeric material.

Since the polymeric material of the jacket 4 completely fills the slot of the metallic sleeve 3, a safeguard against rotation between the two parts is provided. Further, since, as can be seen from FIGS. 1 and 2, the boundary edge 12 of the slot 2 includes a protuberance 13 at a distance from its ends, both parts are also fixed relative to each other in their axial position. The other boundary edge 14 of the slot 2 is of a shape corresponding to the boundary edge 12 which means that it includes a recess 15 in correspondence and oppositely arranged to the protuberance 13. During cutting of the blank for the metallic sleeve 3 from a metallic strip, the design of such boundary edges 12 and 14 allows the production of two boundary edges in one cutting step when using a cutting tool of suitable contour.

The structural element 16 illustrated in FIGS. 5 and 6 and made by the method of the invention differs from the previously described one in that the jacket 17 includes also a slot in the area of the slot 19 of the metallic sleeve 18 and is made of a metallic material. Therefrom the slot 19 of the metallic sleeve 18 is only partially filled with metallic material of the jacket 17 so that the latter engages in the slot 19 of the metallic sleeve 18 only along its boundary edges 20 and 21 and bears with ledge-like, radially inwardly facing projections 22 and 23 against the peripheral surfaces of the slot 19 of the metallic sleeve 18. The metallic sleeve 18 is thus kept in an elastically widened state by the projections 22 and 23 and has under these conditions, a reproducible and defined inner diameter fluctuating within extremely narrow tolerance limits.

In addition to the safeguard against rotation provide by the projections 22 and 23, the metallic sleeve 18 and the jacket 17 are fixed relative to each other in the axial direction by providing each of the boundary edges of the slot 10 of the metallic sleeve 18 with two opposing recesses 24 and 25 of approximately semi-circular shape in which, as shown in FIG. 5 in connection with the boundary edge 20, the metallic material of the jacket 17 engages in projection-like manner. Moreover, such a design of the boundary edges 20 and 21 facilitates the making of the blank for the metallic sleeve 18 from a metallic strip. According to one method, the metallic strip is initially punched in the region of the cutting area by a die of circular cross-section and then separated by a simple straight cutting tool.

Various modifications of the method and structural elements of the invention may be made without departing from the spirit or scope thereof. For example, structural elements with jackets of an arbitrary shape may be produced and the jacket material may engage in the slot of the metallic sleeve in a different manner than shown in the specific embodiments. It should be understood that the invention is intended to be limited only as defined in the appended claims.

What I claim is:

1. A method of producing a structural element comprising a metallic sleeve provided with a continuous axial slot at a circumferential area and an outer surface completely surrounded by a polymeric jacket comprising producing a metallic sleeve (3,18) with an inner diameter corresponding to a maximum of the inner diameter of the finished structural element (1,16), placing said metallic sleeve on a core (8) in an injection molding apparatus (5), said core (8) receiving the metallic sleeve (3,18) and elastically widening the metal-sleeve (3,18) when placed on the core (8), closing the molding apparatus and injecting polymeric material into the molding apparatus, at least partially filling the slot (2,19) of the metallic sleeve (3,18) with the material of the jacket (4,17) during formation of the jacket (4,17) so that the boundary surfaces of the slot (2,19) of the metallic sleeve (3,18) are at least partially covered.

2. The method of claim 1 wherein the metallic sleeve is a thin-walled cylindrical metallic sleeve.

* * * * *